Patented Jan. 18, 1944

2,339,277

UNITED STATES PATENT OFFICE 2,339,277

CELLULOSE DERIVATIVE

Christopher Luckhaupt, Jamaica, N. Y., assignor to Henry J. Lucke, East Orange, N. J.

No Drawing. Application March 28, 1938, Serial No. 198,605

8 Claims. (Cl. 18—55)

This invention relates to the production of shaped products resulting from the treatment with terpin hydrate of cellulose derivatives soluble in terpin hydrate at and above the melting temperature of terpin hydrate.

For clarity and brevity, the resulting product is herein defined by the term "terpinhydrate-cellulose derivative."

In general, my invention comprises admixing the desired cellulose derivative soluble in terpin hydrate in divided form in a terpin hydrate containing solvent, which solvent assumes liquid and solvent properties with respect to the cellulose derivative at temperatures greatly exceeding the range of atmospheric temperatures, and passing the solution containing the treated cellulose derivative through nozzles or the like provided with aperture means defining the desired sheet or other formation and reducing the temperature of the dissolved or dispersed admixture to a temperature at which the same attains solid status in the desired sheet or other continuous form.

I prefer to employ terpin hydrate having the formula $C_6H_8(OH)_2(CH_3)(C_3H_7) + H_2O$, the melting point of which is 115° C., or equivalent, as the solvent. To render such solvent in liquid status and effect solubility of the cellulose derivative, such solvent is heated to a temperature at or above the melting point of the solvent, and the cellulose derivative in divided form is admixed with the solvent, the resulting solution being in liquid status at the stated treatment temperature.

The production of terpin hydrate to any given amount of the selected cellulose derivative ranges upwardly from any minimum amount effecting the desired degree of liquidification at any desired treating temperature, as is readily determinable by one skilled in the art, in which respect the relative proportion of the selected cellulose derivative and the terpin hydrate at the selected treatment temperature is not critical.

To derive the terpinhydrate-cellulose derivative in the desired sheet or other form, suitable instrumentalities defining the desired form are employed, this step being accompanied by the reduction of the temperature of the terpinhydrate cellulose derivative solution to an extent to render the admixture to solid status.

To form a sheet, an instrumentality such as a nozzle having an aperture dimensioned in correspondence to those of the desired sheet is employed, through which the stated or equivalent solution is forced, and accompanied by a reduction of temperature, to solidify the sheet emerging from such nozzle.

To form a cylindrical casing, such as is known to the trade as a "sausage casing," the aperture of the nozzle is of circular formation of diameter corresponding to the desired diameter of the "sausage casing," and accompanied by reduction of temperature.

To effect such reduction of temperature, positive cooling means employing chilled water or like medium or by positive flow of atmospheric air or direct cooling in the air, may be employed.

For producing terpinhydrate-cellulose derivative in continuous formation of a configuration such as a bottle, the terpinhydrate-cellulose derivative admixture or dispersion is suitably molded in a suitable mold for effecting the desired "bottle" or other configuration, the mold being initially heated to maintain the desired fluidity or plasticity, and later cooled by positive cooling means or allowed to cool in the atmosphere.

The terpinhydrate-cellulose derivative derived pursuant to the invention in continuous solid form, possessing the additional quality of waterproofness or water repellency is obtained by proceeding generally as aforesaid, the solution in this instance containing in addition to terpin hydrate, one or more ingredients, capable combinedly of imparting such quality, such as wax, natural and/or synthetic, and/or oil, natural and/or synthetic and the like, the proportion of such added ingredient or ingredients singly or combinedly, as the case may be, having the range of proportion by weight from 2% to 50%, terpin hydrate having the range of proportion by weight from 50% upwardly correspondingly.

Examples of suitable natural and synthetic waxes, are Montan wax, Carnauba wax, Ceresin wax, ester gum, glyptol, phenol resins, rezyl gums, vinylite, dammar, shellac, and the like.

Examples of suitable natural and synthetic oils, are castor oil, perilla, linseed oil, rape seed oil, China-wood oil, and the like.

To impart electrical insulation and/or dielectric quality to the product, an ingredient such as lead stearate, alone, or admixed with a natural or synthetic wax, as aforesaid, is employed, such ingredient or ingredients, singly and plurally as the case may be, having the range of proportion by weight from 2% to 50%, terpin hydrate having the range of proportion by weight of 50% upwardly correspondingly.

To impart waterproofness to the product, an ingredient such as triphenyl phosphate, zinc acetate, aluminum acetate, aluminum stearate singly or combinedly may be employed, the range of such single or combined added ingredient being in proportion by weight from 2% to 50%, the proportion by weight of terpin hydrate being from 50% upwardly correspondingly.

To impart alcohol-proofness to the product, an ingredient such as a mixture of triphenyl phosphate and cellulose acetate is employed, the range of proportion by weight of such combined ingredients being from 2% to 50%, the proportion by weight of terpin hydrate being from 50% upwardly correspondingly.

To impart proofness against absorption of the contents, such as water and/or milk, of the container, an ingredient such as strontium glycerophosphate may be added. Such ingredient added to terpin hydrate also imparts proofness with respect to carbon tetrachloride, and also hydrocarbons such as ethyl acetate, butyl acetate, amyl acetate, ethyl, butyl or methyl cellusolve, the range of proportion of such added ingredient being by weight from 2% to 50%, the proportion by weight of terpin hydrate being from 50% upwardly correspondingly.

To impart fire-proofness or retardation of combustion, to objects formed of the product, an ingredient such as zinc acetate, triphenyl phosphate, aluminum acetate, aluminum stearate singly or combinedly, the range of proportion by weight of such single or combined added ingredient being in range of proportion from 2% to 50%, the proportion of weight of terpin hydrate being from 50% upwardly correspondingly.

To impart proofness with respect to oil, an ingredient such as strontium glycerophosphate, gum lac (shellac gum), cellulose acetate, or the like may be employed, the range of proportion of such ingredient or ingredients, singly or plurally being in proportion by weight from 2% to 50%, the proportion by weight of terpin hydrate being from 50% upwardly correspondingly.

Cedar oil may be employed as an ingredient with terpin hydrate, in proportion as desired, but usually not exceeding 50% by weight, for rendering objects, such as bags, boxes and other containers formed on the product useful for enclosing wool and like garments for preservation against moths and other vermin. Satisfactory "cedar effect" exudation is attained by employing but 2% by weight proportional quantity of cedar oil.

To impart proofness against rot and worms, cupric stearate, creosote, zinc acetate, zinc stearate may be employed, singly or plurally, the range of proportion by weight of such combined ingredients being from 2% to 50%, the proportion by weight of terpin hydrate being from 50% upwardly correspondingly.

As cellulose derivatives, cellulose acetate alone, ethyl cellulose alone, or preferably cellulose acetate and ethyl cellulose, or nitrocellulose in divided form is employed, or cellulose acetate or ethyl cellulose with nitrocellulose.

Fiber may be formed of the terpinhydrate-cellulose derivative, with or without addition of the aforesaid ingredients, and of desired configuration by employing suitable nozzle means having the desired configuration or cross section of nozzle opening, the precautions above set forth with respect to temperature of the solvent admixtures and reduction of temperature of the product upon flow through the opening of the nozzle means being taken.

Such fiber may be employed in substitution for silk, natural or synthetic, inclusive of rayon. To impart delustering, aluminum acetate may be employed in range of proportion by weight from 2 to 10 per cent.

In all of the aforesaid products opaqueness may be obtained by added diatomaceous earth or the like, in relatively small proportion, i. e., from 2% to 10%.

Color of the product, in its respective forms set forth above, may be obtained by the employment of anilin, vegetable, mineral or other dyes, pigments, the proportion of color corresponding to the desired depth of color tone.

The product, employing terpin hydrate alone as the solvent, is highly translucent and under certain circumstances substantially transparent, homogeneous in structure, and possesses physical characteristics which are uniform throughout, that is to say the tensile strength, flexual strength, compressional strength and the like, each is uniform in all dimensional directions. To enhance the quality of pliability an ingredient such as a natural or synthetic oil, such as referred to above and/or natural or synthetic gum such as referred to above is or are added, in proportion by weight from 2% upwardly dependent upon the degree of pliability desired.

The product of my process is advantageous for material or containers for containing food, beverages, and the like, in that it affords visibility of the contents through the walls of the container. Further, the material is wholly innocuous with respect to chemical action upon the material contained therein, tasteless and inodorous.

A distinct advantage resides in my product, in that heat alone is sufficient to cause autogenous bonding, thus affording sealing when in sheet form, and in securement of cap, cover or the like to the body, merely by application of a proper temperature device, causing sufficient fluidity and bonding upon congealing.

From the above, it appears that the product derived by the invention is produced by admixing the selected cellulose derivative or derivatives and terpin hydrate in relative range of proportions effecting liquidity at or above 115° C., the melting point of terpin hydrate, and the solvency therein of the selected cellulose derivative or derivatives, and treating the resulting hot admixture by suitable shaping means concomitantly with the reduction of the temperature of the admixture below 115° C. In this treatment, it is further observed that the terpin hydrate admixed with the cellulose derivative or derivatives at the melting, i. e., liquidity, stage remains therein thoroughly admixed with the cellulose derivative or derivatives, and is not volatilized and until the completion, i. e., shaping and cooling stage, thus deriving a substantially homogeneous admixture of the terpin hydrate with the cellulose derivative or derivatives in the final product. Further, where additive qualities such as proof against absorption of water, against absorption of milk, absorption of alcohol, fireproofness, oil-proofness, etc., the suitable additional medium is added to the terpin hydrate, the range of proportion of such added medium by weight relative to the proportion of terpin hydrate varying from 2% to 50%.

Whereas, I have described my invention by reference to specific forms thereof, it will be understood that many changes and modifications may be made without departing from the spirit of the invention.

I claim:

1. Terpinhydrate-cellulose derivative in shaped form composed of a cellulose derivative selected from the group consisting of cellulose acetate, ethyl cellulose and nitrocellulose admixed with terpin hydrate resulting by cooling of a melted admixture of the stated ingredients heated to a temperature at or above 115° C.

2. Terpinhydrate-cellulose derivative in shaped form composed of a cellulose derivative selected from the group consisting of cellulose acetate, ethyl cellulose and nitrocellulose admixed with terpin hydrate.

3. Terpinhydrate-cellulose derivative in shaped form having the property of water-proofness composed of a cellulose derivative selected from the group consisting of cellulose acetate, ethyl cellulose and nitrocellulose admixed with terpin hydrate and a water-proofing imparting medium selected from the group consisting of natural wax, synthetic wax, natural oil, and synthetic oil, resulting by cooling of a melted admixture of the stated ingredients heated to a temperature at or above 115° C., the proportion of the water-proofing imparting medium varying from 2% to 50% by weight with respect to the cellulose derivative.

4. Terpinhydrate-cellulose derivative in shaped form having the property of oil-proofness composed of a cellulose derivative selected from the group consisting of cellulose acetate, ethyl cellulose and nitrocellulose admixed with terpin hydrate and an oil-proofing imparting medium selected from the group consisting of strontium glycero-phosphate and gum lac, resulting by cooling of a melted admixture of the stated ingredients heated to a temperature at or above 115° C., the proportion of the oil-proofing imparting medium varying from 2% to 50% by weight with respect to the cellulose derivative.

5. Terpinhydrate-cellulose derivative in shaped form having the property of fire-proofness composed of a cellulose derivative selected from the group consisting of cellulose acetate, ethyl cellulose and nitrocellulose admixed with terpin hydrate and a fire-proofing imparting medium selected from the group consisting of triphenylphosphate, zinc acetate, aluminum acetate, and aluminum stearate, resulting by cooling of a melted admixture of the stated ingredients heated to a temperature at or above 115° C., the proportion of the fire-proofing imparting medium varying from 2% to 50% by weight with respect to the cellulose derivative.

6. Terpinhydrate-cellulose derivative in shaped form having the property of water-proofness composed of a cellulose derivative selected from the group consisting of cellulose acetate, ethyl cellulose and nitrocellulose admixed with terpin hydrate and a water-proofing imparting medium selected from the group consisting of natural wax, synthetic wax, natural oil, and synthetic oil, the proportion of the water-proofing imparting medium varying from 2% to 50% by weight with respect to the cellulose derivative.

7. Terpinhydrate-cellulose derivative in shaped form having the property of oil-proofness composed of a cellulose derivative selected from a group consisting of cellulose acetate, ethyl cellulose and nitrocellulose admixed with terpin hydrate and an oil-proofing imparting medium selected from the group consisting of strontium glycero-phosphate and gum lac, the proportion of the oil-proofing imparting medium varying from 2% to 50% by weight with respect to the cellulose derivative.

8. Terpinhydrate-cellulose derivative in shaped form having the property of fire-proofness composed of a cellulose derivative selected from the group consisting of cellulose acetate, ethyl cellulose and nitrocellulose admixed with terpin hydrate and fire-proofing imparting medium selected from the group consisting of triphenylphosphate, zinc acetate, aluminum acetate, and aluminum stearate, the proportion of the fire-proofing imparting medium varying from 2% to 50% by weight with respect to the cellulose derivative.

CHRISTOPHER LUCKHAUPT.